(No Model.) 2 Sheets—Sheet 1.
W. P. FREEMAN.
DYNAMO ELECTRIC MACHINE AND ELECTRIC MOTOR.
No. 393,636. Patented Nov. 27, 1888.
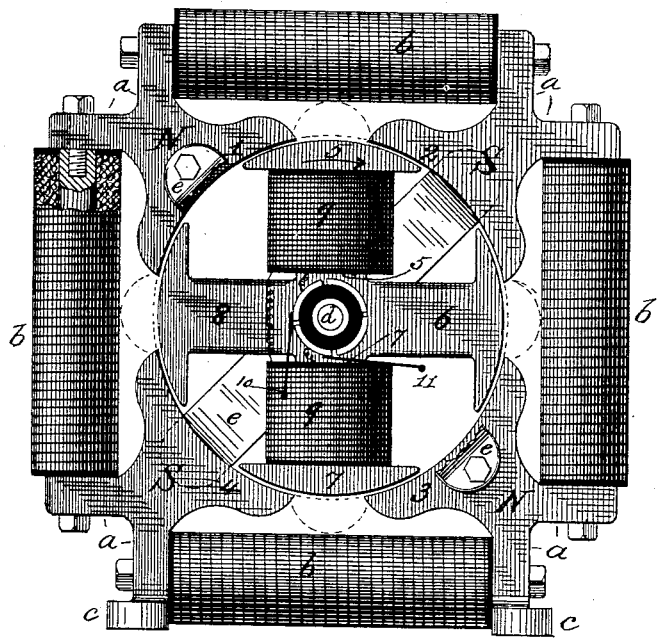
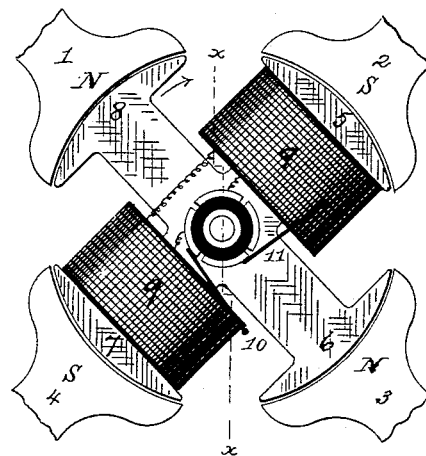
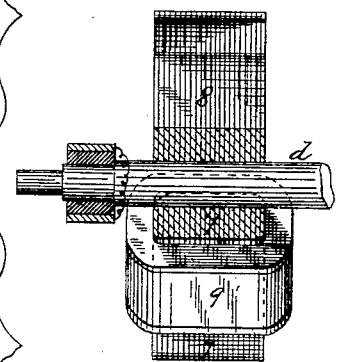
WITNESSES: Warren P. Freeman, INVENTOR,
E. Myers,
S. Field,
BY
McTigher & Worthington,
ATTORNEYS.

(No Model.) 2 Sheets—Sheet 2.
W. P. FREEMAN.
DYNAMO ELECTRIC MACHINE AND ELECTRIC MOTOR.
No. 393,636. Patented Nov. 27, 1888.
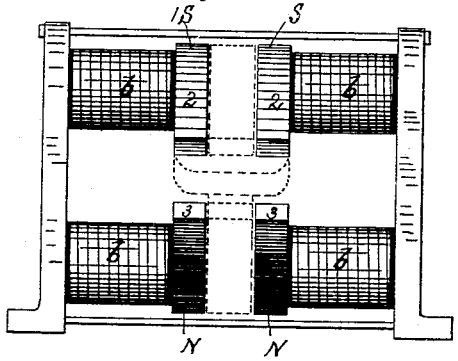
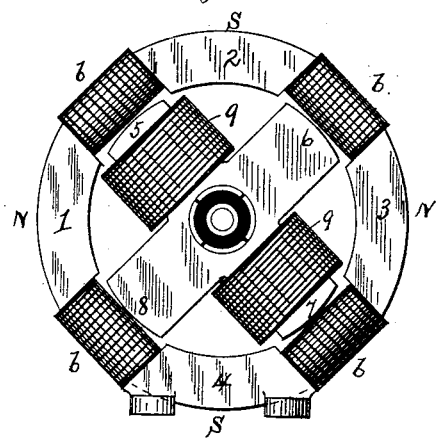
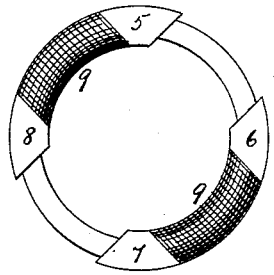
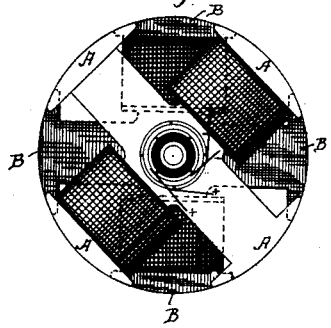
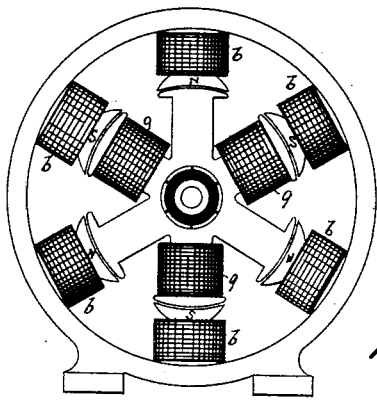
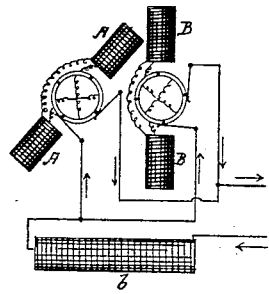
WITNESSES:
E. Myers.
S. Field.
Warren P. Freeman
INVENTOR,
BY
McTigher & Worthington.
ATTORNEYS.
N. PETERS, Photo-Lithographer, Washington, D. C.

UNITED STATES PATENT OFFICE.

WARREN P. FREEMAN, OF NEW YORK, N. Y.

DYNAMO-ELECTRIC MACHINE AND ELECTRIC MOTOR.

SPECIFICATION forming part of Letters Patent No. 393,636, dated November 27, 1888.

Application filed March 29, 1888. Serial No. 268,737. (No model.)

*To all whom it may concern:*

Be it known that I, WARREN P. FREEMAN, a citizen of the United States, residing at New York, in the county of New York and State of New York, have invented certain new and useful Improvements in Dynamo-Electric Machines and Electric Motors; and I do hereby declare the following to be a full, clear, and exact description of the invention, such as will enable others skilled in the art to which it appertains to make and use the same.

This invention relates to the construction of dynamo-electric machines and electric motors; and it consists in the form of armature and its relations to the field-magnets, substantially as hereinafter fully described and claimed, reference being had to the accompanying drawings, which form part of this specification, in which—

Figure 1 is an end view of a machine constructed as a generator and showing the relation of polarity according to my invention. Fig. 2 is a similar view showing the polar relations of the machine as a motor. Fig. 3 is a longitudinal section of the armature, taken on the line $x\ x$ of Fig. 2. Fig. 4 is a side elevation of a modified form of field-magnet, wherein the armature-extensions pass between pole-pieces after the manner of the well-known Brush machine. Fig. 5 is an elevation of a machine, illustrating the absence of the short-circuiting feature in the relations of field-poles and expanded armature pole-pieces. Fig. 6 is an elevation of a ring armature according to my invention. Fig. 7 is an elevation showing my invention applied to a six-pole machine, only three of the six radial arms of the armature being wound. Fig. 8 is an end elevation showing a double armature and a single four-pole field-magnet, and Fig. 9 is a diagram illustrating a system of circuits which may be adopted for the double-armature machine.

The form of machine to which my invention is particularly well adapted is that which may conveniently be termed "multipolar armature"—that is, an armature whose generating-coils are wound on radial iron arms or spokes whose ends pass in close proximity to the poles of the field-magnets, and by the changes and reversals of induced magnetism in such arms or cores the potential is established or absorbed between the terminals of such coils according as the machine is a generator or a motor.

My improvements apply more especially to the form of armature and field-magnets and the peculiar arrangements of polarity in the former.

I will first describe the form in which I prefer to embody my invention, stating, however, that certain modifications may be made as to number of poles and arrangement, as will be seen hereinafter. Such preferable form is clearly illustrated by Figs. 1, 2, and 3 and is constructed as follows:

I first cast the pole-pieces in the form of a complete circle, as indicated by the dotted lines, with the projections $a$ for the reception of the field-magnets $b$, which are fitted to place and bolted fast. The interior is first bored out true in a lathe and faced where required, after which the field-magnets are bolted in place and thus form a solid structure. Then the circular part is notched and broken away so as to divide the circle into four pole-pieces, 1 2 3 4, and the magnets $b$ are joined up in series or multiple, so as to give diametrically-opposite pole-pieces similar polarity, (in the case of four pole-pieces,) or, in other words, to make successively-opposite poles, as indicated by the letters N and S in the figures. Suitable foot-pieces or toes, $c$, may be cast on or attached for bolting the machine in position.

The armature-shaft $d$ is sustained by suitable bearing-brackets, $e$, preferably of brass or bronze, though they may in this case be of iron, if bolted, as shown, to similar poles. For a four-pole machine the armature consists of four radial iron arms, 5, 6, 7, and 8, equidistant apart. Two of these, situated diametrically opposite—say 5 and 7—are wound with insulated conductor 9 continuous over both, while the remaining arms, 6 and 8, are left without winding, and there are but two ends of the conductor 9 to connect to the commutator. The latter may conveniently be made of a copper sleeve mounted on an insulating-hub and sawed or slitted into four equal segments, the opposite pairs of which are cross-connected, and to the respective pairs I connect the ends of conductor 9. Thus any two adjoining segments are connected to opposite ends of the armature-circuit. The brushes 10 and 11 are set ninety degrees apart, being mounted in any desired manner.

The construction as motor is the same, but the relative point of commutation is angularly different, as can be seen from inspection of Figs. 1 and 2.

In operation as a dynamo the actions are as follows: Suppose the armature to be moving and arm 5 has arrived at a position midway between the centers of pole-pieces 1 and 2. The circular expansions of arms 5, 6, 7, and 8 in this position practically close the magnetic circuit between all the poles of the field-magnets 1, 2, 3, and 4, and the armature proper is neutral as to generation of current or setting up of potential difference. As soon as this bridging or magnetic short-circuiting is terminated by the onward movement of the armature, the magnetic circuit between poles 1 and 2 is by the way of arms 8 and 5, between poles 2 and 3 by way of arms 5 and 6, between poles 3 and 4 by way of arms 6 and 7, and between poles 4 and 1 by way of arms 7 and 8, the completeness of these magnetic circuits increasing until the arms are under the respective poles and decreasing as they move past until their extremities again form magnetic short circuits between the poles of the field-magnets, when the armature again becomes neutral, and so on, through four neutral positions ninety degrees apart, and during the intervals between such positions powerful magnetic induction takes place, the direction of current reversing after each such neutral position. At the same time the commutator-segments move around under the brushes so as to deliver the current always in the same direction thereto. I have shown the arms 5, 6, 7, and 8 of the armature with expanded extremities sufficient to underlie two adjoining pole-pieces of the field-magnet, and thus, at certain positions of revolution, as above explained, bring about a condition of complete short-circuiting of the field magnetism through the expanded pole-pieces of the armature. Fig. 5 illustrates the absence of this short-circuiting feature when the pole-pieces of the armature are not expanded, and in this case it will be observed that lines of force would necessarily pass through the winding on the radial arms of the armature and disturb the actions which I desire to have take place during the rotation of the armature. I also prefer to expand the pole-pieces of the field-magnets so that each covers about eighteen per cent. of the total circumference.

For use as a motor it is only necessary to shift the commutator or brushes about forty-five degrees, so that commutation takes place just after the arms have passed the center of the field-magnet pole-pieces, as shown in Fig. 2, when powerful repulsion is set up from such pole-pieces and attraction for the succeeding pole-pieces, until at ninety degrees commutation again takes place and the process is repeated. There is, therefore, no dead-point in the motor embodying my invention, but a continuous summation of attractions and simultaneous repulsions.

In all cases I prefer to laminate the armature and insulate its plates from one another, as illustrated in Fig. 3.

As before stated, I do not confine the scope of my invention to the precise forms herein described. For instance, the ring form of armature may be used having polar extensions of the character described and only half the number of intervening spaces wound, as shown in Fig. 6. The same principle underlies them all.

Instead of a single armature within the field-poles, I may lengthen the latter in the direction of the axis and place within them a double armature arranged as shown at Fig. 8, where A represents the respective pole-pieces of one armature, and B those of the other arranged alongside on a common shaft. As will be seen, one armature is given an angular lead of about forty-five degrees.

Each armature has its own independent commutator, and the mode of connection which I prefer is illustrated at Fig. 9, where the field-magnet is in series with both armatures arranged in multiple. By this arrangement the pull exerted by the armature acting as a motor is made more uniform, because when the pole of one armature has passed the center line of its corresponding pole-piece and repulsion is set up the next following pole of the other armature has reached position of greatest pull, and so on continuously, one armature getting strongest pull at the moment when the other is acting on repulsion.

What I claim as my invention, and desire to secure by Letters Patent, is as follows:

1. The combination of a four or more pole field-magnet alternating in polarity with an iron armature-body having a similar number of poles extended in close proximity to said field-poles, and having expanded pole-pieces so proportioned, substantially as described, as to be capable each of overlapping two adjacent field-poles and short-circuiting their magnetism by affording a direct path for the lines of force between said poles, one-half only of the poles or arms of said armature being wound, and a commutator having plates corresponding in number with the total number of poles of said armature and connected in pairs.

2. The combination of a four or more pole field-magnet alternating in polarity with two iron multipolar armatures, one having an angular lead with respect to the other, and each armature having an independent commutator, substantially as described.

In testimony whereof I affix my signature in presence of two witnesses.

WARREN P. FREEMAN.

Witnesses:
T. J. McTIGHE,
E. D. MYERS.